(12) United States Patent
Rohrbacher

(10) Patent No.: US 11,320,956 B2
(45) Date of Patent: May 3, 2022

(54) COMBINED EYE AND GESTURE TRACKING METHOD

(71) Applicant: HARMAN BECKER AUTOMOTIVE SYSTEMS GmbH, Karlsbad-Ittersbach (DE)

(72) Inventor: Adam Rohrbacher, Stuttgart (DE)

(73) Assignee: Harman Becker Automotive Systems Gmbh, Karlsbad-Ittersbach (DE)

( * ) Notice: Subject to any disclaimer, the term of this patent is extended or adjusted under 35 U.S.C. 154(b) by 0 days.

(21) Appl. No.: 16/345,687

(22) PCT Filed: Jul. 5, 2017

(86) PCT No.: PCT/EP2017/066782
§ 371 (c)(1),
(2) Date: Apr. 26, 2019

(87) PCT Pub. No.: WO2018/077491
PCT Pub. Date: May 3, 2018

(65) Prior Publication Data
US 2019/0294312 A1    Sep. 26, 2019

(30) Foreign Application Priority Data
Oct. 26, 2016  (EP) .................................... 16195740

(51) Int. Cl.
*G06F 3/04812*    (2022.01)
*G06F 3/01*    (2006.01)
*G06F 3/0482*    (2013.01)
*G06F 3/03*    (2006.01)

(52) U.S. Cl.
CPC .......... *G06F 3/04812* (2013.01); *G06F 3/013* (2013.01); *G06F 3/017* (2013.01); *G06F 3/0304* (2013.01); *G06F 3/0482* (2013.01); *G06F 2203/0381* (2013.01)

(58) Field of Classification Search
CPC combination set(s) only.
See application file for complete search history.

(56) References Cited

U.S. PATENT DOCUMENTS

| 5,710,574 | A | 1/1998 | Jaaskelainen, Jr. | |
|---|---|---|---|---|
| 6,204,828 | B1 * | 3/2001 | Amir | ...................... G06F 3/013 345/157 |
| 2012/0272179 | A1 * | 10/2012 | Stafford | .................. G06F 3/012 715/781 |
| 2017/0123492 | A1 * | 5/2017 | Marggraff | .............. H04N 5/247 |

OTHER PUBLICATIONS

International Search Report and Written Opinion PCT/EP2017/066782, dated Aug. 11, 2017.

\* cited by examiner

Primary Examiner — Robin J Mishler
(74) Attorney, Agent, or Firm — Artegis Law Group, LLP

(57) ABSTRACT

Method for controlling a combined eye and gesture tracking system (100), wherein the method comprises providing a graphical user interface (102) to a user including a plurality of graphical items (110) displayed on the graphical user interface (102, 300), displaying a graphical pointer (120) on the graphical user interface (102, 310), detecting a user eye gaze (210) associated with the eyes of the user (320), detecting a displacement user gesture (230) associated with a body part of the user (330), and controlling a rate of movement of the graphical pointer (120) on the graphical user interface based on the displacement user gesture (230) and the user eye gaze (210, 340).

12 Claims, 11 Drawing Sheets

US 11,320,956 B2

COMBINED EYE AND GESTURE TRACKING METHOD

CROSS-REFERENCE TO RELATED APPLICATIONS

The present application is a national stage application of the international application titled, "COMBINED EYE AND GESTURE TRACKING," filed on Jul. 5, 2017 and having application number PCT/EP2017/066782, which claims priority benefit of the European Patent Application titled, "COMBINED EYE AND GESTURE TRACKING," filed on Oct. 26, 2016, and having Ser. No. 16/195,740.2. The subject matter of this related application is hereby incorporated herein by reference.

TECHNICAL FIELD

Various embodiments relate to a method for controlling a combined eye and gesture tracking system, and in particular to a method for controlling a combined eye and gesture tracking system for a graphical user interface in an automotive environment.

BACKGROUND

Use of electronic devices, such as navigation systems, communication devices, and media players, is becoming increasingly popular in automotive environments. Such devices provide users with convenient access to informational content, such as navigational instructions, media content, such as music, news, communication services and means to control the operation of a vehicle.

Human machine interfaces (HMI) are known to include graphical user interfaces displaying a plurality of menu items. Menu items may relate to entries of a graphical menu of the graphical user interface which can be selected or activated by the user using e.g. a graphical pointer. Upon said selection, a certain functionality may be accessed or invoked, e.g. a sub-menu and/or a function or application and/or a change of settings, etc. For example, menu items may relate to one or more of the following: applications, audio and/or video tracks, system settings, pictures, downloaded items.

Often a plurality of such menu items is displayed on a display. A user may select and activate a particular one of the plurality of menu items, depending on his selection choice, by controlling a graphical pointer on the graphical user interface. For this, at one given point in time the plurality of menu items may be displayed on the display at least partially or entirely and the user may select one of the menu items from the plurality of menu items by moving the graphical pointer to one of the menu items using e.g. mechanical buttons, a touch controller, touch display, independent eye tracking or independent gesture tracking systems.

In situations as set forth above, in particular independent eye tracking technology and independent gesture tracking technology offer to the user the potential for convenient interacting with a graphical user interface. However, such techniques face certain limitations: the control options provided by an eye or gesture tracking system may not be satisfactory. Furthermore speed and precision of the eye or gesture tracking system may be limited.

SUMMARY

Accordingly there is a need to provide a method and system for combined eye and gesture tracking for a graphical user interface, which provides improved control to a user.

According to an embodiment, a method for controlling a combined eye and gesture tracking system is provided, wherein the method comprises the following steps: Providing a graphical user interface to a user including a plurality of graphical items displayed on the graphical user interface, displaying a graphical pointer on the graphical user interface, detecting a user eye gaze associated with the eyes of the user, detecting a displacement user gesture associated with a body part of the user, and controlling a rate of movement of the graphical pointer on the graphical user interface based on the displacement user gesture and the user eye gaze.

Thereby, a method for controlling a combined eye and gesture tracking system is provided, that may have increased precision and increased speed in the control by a user. The response speed of the combined eye and gesture tracking system may be increased, e.g., if compared to conventional eye or gesture tracking systems. Thus, a faster and more precise access to graphical user interface elements may be provided to the user, which, in an automotive environment, typically increases the safety of operation of a vehicle. Further, the design and production of a vehicle can be realized easier and with less cost with a greater freedom in placing a screen within the vehicle compared to conventional eye or gesture tracking systems. By controlling a rate of movement of the graphical pointer on the graphical user interface based on the displacement user gesture and the user eye gaze, a possible misalignment calibration error of the eye tracking may be corrected by continuously tracking of the displacement user gesture direction and accordingly adjusting of the displacement direction of the graphical pointer without the user's notice. In particular, in such a case of a misalignment calibration error of the eye tracking system, the user may look at a particular graphical item, but due to the misalignment calibration error the eye tracking system may recognize his eye gaze not as correlated with the particular graphical item, but with a position besides the particular graphical item, then the user would have to look to a position besides the particular graphical item to the other direction, in order to correct the misalignment calibration error. By continuously tracking of the displacement user gesture direction and accordingly adjusting of the displacement direction of the graphical pointer without the user's notice, the user does not have to look besides the graphical item to select the graphical item. Additionally, moving a graphical pointer in a translational movement on a screen may be more intuitive by a displacement user gesture than by a user eye gaze.

Further, the method can comprise detecting that the displacement user gesture corresponds to one of a plurality of predetermined displacement user gestures associated with a body part of the user, wherein the body part of the user is moved in a displacement direction relative to the graphical user interface, and controlling a rate of movement of the graphical pointer can comprise moving the graphical pointer with a variable rate of movement in the displacement direction to a position associated with one of the plurality of graphical items taking into account the user eye gaze. That the displacement user gesture corresponds to one of a plurality of predetermined displacement user gestures may provide the effect that the graphical pointer can't be accidentally displaced, if the user makes an arbitrary moving user gesture. This may increase the precision and safety of the combined eye and gesture tracking system. Such controlling a rate of movement of the graphical pointer may additionally increase the speed, precision and access rate of the combined eye and gesture tracking system.

Further, the graphical pointer can be selectively moved based on a correlation of the displacement user gesture with the user eye gaze, thereby further increasing the precision and speed of the combined eye and gesture tracking system.

Further, detecting a user eye gaze can comprise determining that the user is looking at the graphical user interface, and determining an eye focus position on the graphical user interface, wherein the graphical pointer is moved only if the displacement direction is directed in a direction where the eye focus position is located. That the graphical pointer is moved only if the displacement direction is directed in a direction where the eye focus position is located further increases the precision, speed and safety of the combined eye and gesture tracking system.

Further, controlling a rate of movement of the graphical pointer can comprise comparing the displacement direction with the eye focus position, and moving the graphical pointer with a higher speed, only if the displacement direction correlates with the eye focus position. Moving the graphical pointer with a higher speed, only if the displacement direction correlates with the eye focus position further increases the precision, speed and safety of the combined eye and gesture tracking system.

Further, each graphical item can comprise a predetermined snap-in area around the graphical item, wherein a rate of movement of the body part leads to a smaller rate of movement of the graphical pointer when the graphical pointer is within the predetermined snap-in area and the displacement direction is not substantially in direction to the graphical item, compared to a rate of movement of the graphical pointer when the graphical pointer is within the predetermined snap-in area and the displacement direction is substantially in direction to the graphical item or when the graphical pointer is not within the predetermined snap-in area. The snap-in area provides a further increased precision and speed and more intuitive usability of the combined eye and gesture tracking system, wherein the graphical pointer tends to be held in position over a menu item, respectively is more easily stopped, once it has reached the graphical target item.

Further, the method for controlling a combined eye and gesture tracking system can comprise detecting an initiation user gesture, determining if the initiation user gesture is substantially equal to a predetermined initiation user gesture, wherein the steps of displaying a graphical pointer and controlling a rate of movement of the graphical pointer are performed only if the initiation user gesture is substantially equal to the predetermined initiation user gesture. That the steps of displaying a graphical pointer and controlling a rate of movement of the graphical pointer are performed only if the initiation user gesture is substantially equal to the predetermined initiation user gesture provides the effect of preventing that the user accidentally activates functions or moves the graphical pointer implicitly. Thereby, gesture processing logic is improved by providing faster and more precise access to the graphical elements. Therefore, the user can look at all items without visible action of the Human Machine Interface (HMI), e.g. moving the graphical pointer, highlighting certain graphical items, activating certain graphical items. In particular, if eye focus position is displayed to the user, a risk of jumping of the displayed eye focus position on the graphical user interface is avoided.

Further, displaying the graphical pointer can comprise determining an initiation position of the graphical pointer on the graphical user interface, and displaying the graphical pointer at the initiation position. By displaying the pointer at the determined initiation position, the reaction time of the combined eye and gesture tracking system is reduced, as the graphical pointer is easier controlled from the initiation position by the user than from an arbitrary position on the graphical user interface.

Further, the initiation position of the graphical pointer can be the eye focus position on the graphical user interface, or the position on the graphical user interface, which the user has been looking at for the longest time within a predetermined time range, or the position on the graphical user interface, which the user has been looking at with the highest count of refocusing actions within a predetermined time range, or a median of determined eye focus positions that have been determined within a predetermined time range. Thereby, an initial position of the graphical pointer is chosen, that corresponds to the user's actions and needs at the moment of displaying the graphical pointer, thus the reaction time of the combined eye and gesture tracking system is reduced, as the graphical pointer is easier controlled from the initiation position by the user than from an arbitrary position on the graphical user interface. Furthermore, the initiation position can be a predetermined position on the graphical user interface, a so-called home position, which can be typical for each menu page and therefore is easily recognized by the user.

Further, the method for controlling a combined eye and gesture tracking system can comprise detecting an engagement user gesture associated with the body part of the user, determining, if the engagement user gesture is substantially equal to a predetermined engagement user gesture, and selecting the one of the plurality of graphical items associated with the position of the graphical pointer, if the engagement user gesture is substantially equal to a predetermined engagement user gesture. Selecting the one of the plurality of graphical items associated with the position of the graphical pointer, if the engagement user gesture is substantially equal to a predetermined engagement user gesture has the effect of preventing that the user accidentally activates functions. Thereby, gesture processing logic is improved by providing faster and more precise access to the graphical elements and safety of the vehicle operation is increased.

Further, the method for controlling a combined eye and gesture tracking system can comprise setting the graphical pointer to a locked state during a transformation between user gestures of the body part or during the execution of a user gesture that is not authorized to change the position of the graphical pointer in such a way, that during the locked state, the position of the graphical pointer cannot be substantially changed from the last valid position of the graphical pointer until a user gesture is recognized, which is authorized to change the position of the graphical pointer. Setting the graphical pointer to a locked state has the effect of preventing that the user accidentally moves the graphical pointer. Therefore, the position of the graphical pointer remains unchanged during transition of gestures, during change of HMI display, providing the same user feeling as on a traditional desktop computer. Thereby, gesture processing logic is improved by providing faster and more precise access to the graphical elements.

Further, the body part can comprise at least one of a finger, in particular index finger, part of a hand, a hand, part of an arm, an arm, or part of a shoulder of the user, having the effect, that user has more freedom to move while controlling the combined eye and gesture tracking system and can thus control the vehicle in a safer manner.

Further, the method for controlling a combined eye and gesture tracking system can comprise detecting, that a user gesture made by the user is not substantially equal to one of the group of predetermined initiation gesture, predetermined displacement gesture or predetermined engagement gesture, and removing the graphical pointer from the graphical user interface. By removing the graphical pointer from the graphical user interface if it is detected that a user gesture made by the user is not substantially equal to one of the group of predetermined initiation gesture, predetermined displacement gesture or predetermined engagement gesture, the user does not have to terminate the process of control by a separate user action and thus the vehicle can be controlled in a safer way.

According to a further embodiment, a combined eye and gesture tracking system is provided comprising at least one camera, at least one graphical user interface, a memory configured to store program code, at least one processor coupled with the memory and the at least one graphical user interface and configured to execute the program code, wherein execution of the program code causes the at least one processor to perform the following: Displaying a plurality of graphical items on the graphical user interface to a user, displaying a graphical pointer on the graphical user interface, detecting a displacement user gesture associated with a body part of the user, detecting a user eye gaze associated with the eyes of the user, and controlling a rate of movement of the graphical pointer on the graphical user interface based on the displacement user gesture and the user eye gaze.

Thereby, a combined eye and gesture tracking system is provided that has increased precision and speed for the control by a user, wherein the response speed of the combined eye and gesture tracking system may be increased and a faster and more precise access to HMI elements may be provided to the user compared to conventional eye or gesture tracking systems. Further, the design and production of a vehicle can be realized easier and with less cost with a greater freedom in placing a screen within the vehicle compared to conventional eye or gesture tracking systems. By controlling a rate of movement of the graphical pointer on the graphical user interface based on the displacement user gesture and the user eye gaze, a possible misalignment calibration error of the eye tracking may be corrected by continuously tracking of the displacement user gesture direction and accordingly adjusting of the displacement direction of the graphical pointer without the user's notice. In particular, in such a case of a misalignment calibration error of the eye tracking system, the user does not have to look besides the graphical item to select the graphical item. Additionally, moving a graphical pointer in a translation movement on a screen is more intuitive by a displacement user gesture than by a user eye gaze.

Although specific features described in the above summary and the following detailed description are described in connection with specific embodiments and aspects of the present disclosure, it should be understood that the features of the exemplary embodiments and aspects may be combined with each other unless specifically noted otherwise.

BRIEF DESCRIPTION OF THE DRAWINGS

The present disclosure will now be described in more detail with reference to the accompanying drawings.

DETAILED DESCRIPTION OF THE EMBODIMENTS

Figure 1:
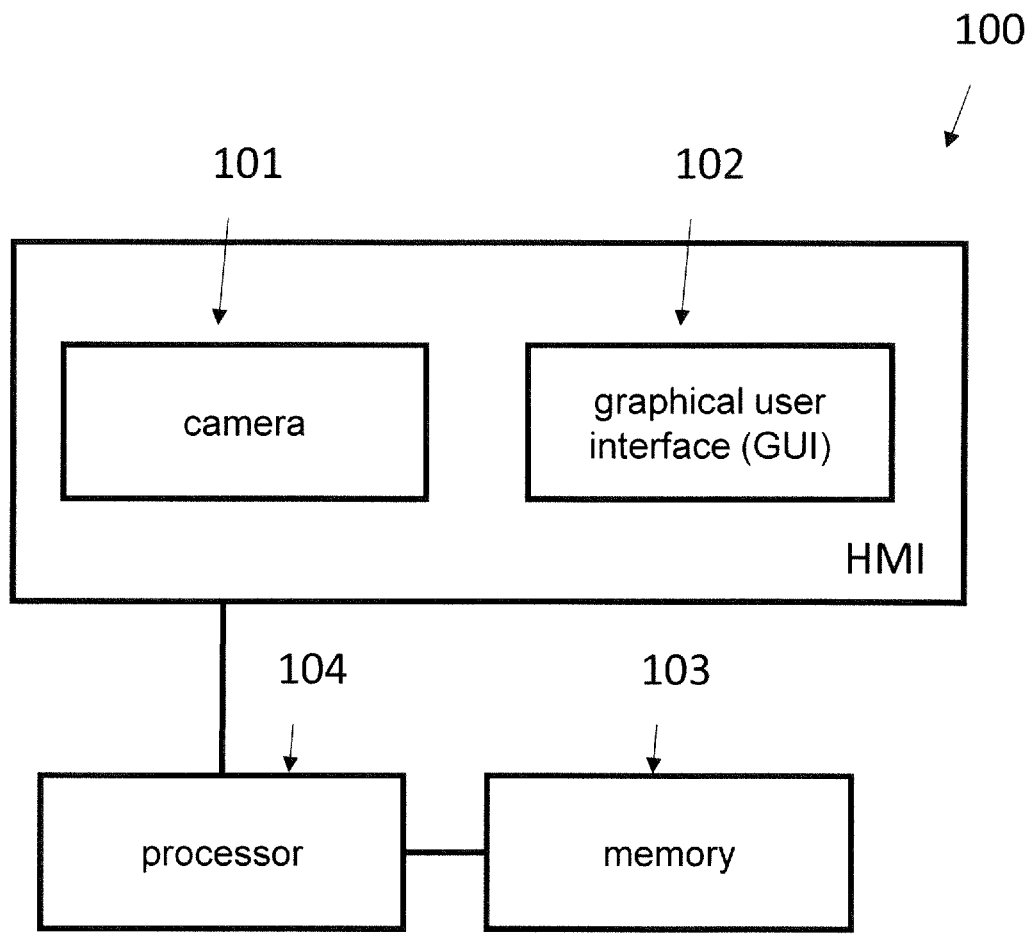
FIG. 1 illustrates a schematic drawing of a combined eye and gesture tracking system according to embodiments of the present disclosure.

In the following, concepts in accordance with exemplary embodiments will be explained in more detail and with reference to the accompanying drawings.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, various techniques with respect to employing a combined eye and gesture tracking system are described. In some examples, the combined eye and gesture tracking system may be employed in a vehicle such as a passenger car.

FIG. 1 illustrates a schematic drawing of a combined eye and gesture tracking system 100 according to embodiments of the present disclosure. The combined eye and gesture tracking system 100 comprises a camera 101, a graphical user interface 102, a memory 103, and a processor 104. The memory 103 may be non-volatile. The combined eye and gesture tracking system 100 further comprises a Human Machine Interface (HMI) comprising the camera 101 and the graphical user interface 102. Generally, the Human Machine Interface (HMI) may comprise more than one camera 101 and more than one graphical user interface 102. The Human Machine Interface (HMI) may comprise elements such as: a touch screen, voice control, a keypad, and/or steering wheel buttons, etc.

Different mounting positions of the camera 101 are conceivable. One or more cameras 104 may be mounted below the instrument cluster, e.g., horizontally centered below the instrument cluster with 0 degree horizontal angle, shifted forward towards the driver with a slightly higher vertical angularity (towards the face of an average size person) than the instrument cluster. The vertical angle of the camera could also be linked to the steering wheel adjustment. When presuming that a driver is responsible for setting up a reasonable steering wheel adjustment regarding ergonomics and a clear view on the instrument cluster, then possibly a static mounting position (regarding depth and vertical angle) is sufficient for covering a wide range of sizes of drivers. One or more cameras 101 may be mounted on the instrument cluster hood. Horizontally centered on the instrument cluster hood with 0 degree horizontal angle, possibly shifted backward towards the windshield with a suitable vertical angle (towards the face of an average size person). This mounting position could enable the combined eye and gesture tracking system for use with head-up systems. One or more cameras 101 may be mounted near an A-pillar (driver side). One or more cameras 101 may be centered on the dashboard. One or more cameras 104 may be mounted below the central display. Generally, any other position giving adequate performance/precision is available for mounting one or more cameras 101.

A suitable camera can be an infrared camera. Here, bright-pupil tracking can be used for reliable eye-tracking systems. By using infrared/near-infrared light as illumination source, and even more reliable eye tracking can be implemented. Also passive infrared cameras may be employed. The illumination source, if available, can be active whenever eye or gesture tracking is enabled, even during daytime. Available eye or gesture tracking solutions based on camera, control unit, and software may detect and adapt discretely to changes in the lighting conditions. As infrared/near-infrared light is invisible for the human eye, it doesn't cause distraction.

The processor 104 of the combined eye and gesture tracking system 100 is configured to implement techniques of eye and gesture tracking. E.g., the processor 104 may be configured to execute the method as illustrated by one of the flowcharts of FIGS. 9 to 11.

For effective operation and control by a user, Human machine interfaces (HMI) can include graphical user interfaces displaying a plurality of menu items. Menu items may relate to entries of a graphical menu of the graphical user interface which can be selected or activated by the user using a graphical pointer. A graphical pointer corresponds to a moveable item, like a mouse pointer, a target cross, a spotlight or the like, all of which are representing the current HMI focus of the system, displayed on the graphical user interface 102. The graphical pointer corresponds to a position on the graphical user interface 102. A user may select and activate a particular one of the plurality of menu items beneath the graphical pointer depending on his selection choice, by using the graphical pointer on the graphical user interface. For this, at one given point in time the plurality of menu items may be displayed on the graphical user interface at least partially or entirely and the user may select one of the menu items from the plurality of menu items by controlling the graphical pointer to a position corresponding to one of the menu items using e.g. hardware buttons, a touch display, touch controller, eye tracking or gesture tracking.

A user eye gaze can correspond to: the user is looking at a given point of the display, the eye-tracking system recognizes/calculates the coordinates and optionally the level of variance/inaccuracy of the visual focus and passes the data to a processor.

The graphical user interface may be depicted on one or more displays. E.g., the graphical user interface may be depicted on a cluster instrument display of a vehicle, a center console display, an infotainment display, and/or a head-up display (HUD). Also, three dimensional displays, e.g. autostereoscopic displays, are conceivable.

Where a given menu item is activated, a corresponding function associated with the respective menu item may be activated or triggered. Activation of the function may comprise one or more of the following: triggering display of additional information, e.g., in a reserved area of the graphical user interface and/or nearby the activated menu item using, e.g., a pop-up window. E.g., a function can be any audio-visual reactions such as a pop-up menu being displayed, a menu being browsed, etc. Additional information may also be displayed within the menu item, e.g., by changing its shape or form. Alternatively or additionally, a function can correspond to a non-visual reaction which changes the internal state of a vehicle component. In some examples, the function can correspond to logging the last coordinate of the orientation of the eye gaze. Activation of the function associated with a given menu item may also comprise changing one more operational parameters of the vehicle or of a vehicle component, e.g., a volume of an entertainment system, wiper speed, temperature of the air conditioning system, etc.

The techniques described herein may be applicable to driver and/or codriver control of a vehicle-based eye-tracking system. One or more cameras may define one or more fields of view which include the driver seating area and/or the codriver seating area. If the driver and codriver are enabled to operate the same physical display (e.g. of the infotainment system—usually a central display), then it may be desirable to provision a split view display, which offers e.g. two independent Human Machine Interfaces (HMI) for driver and codriver, e.g., separated by viewing angle. Alternatively or additionally, it may be possible to implement a "master/slave" logic to solve access conflicts between driver and codriver.

Figure 2:
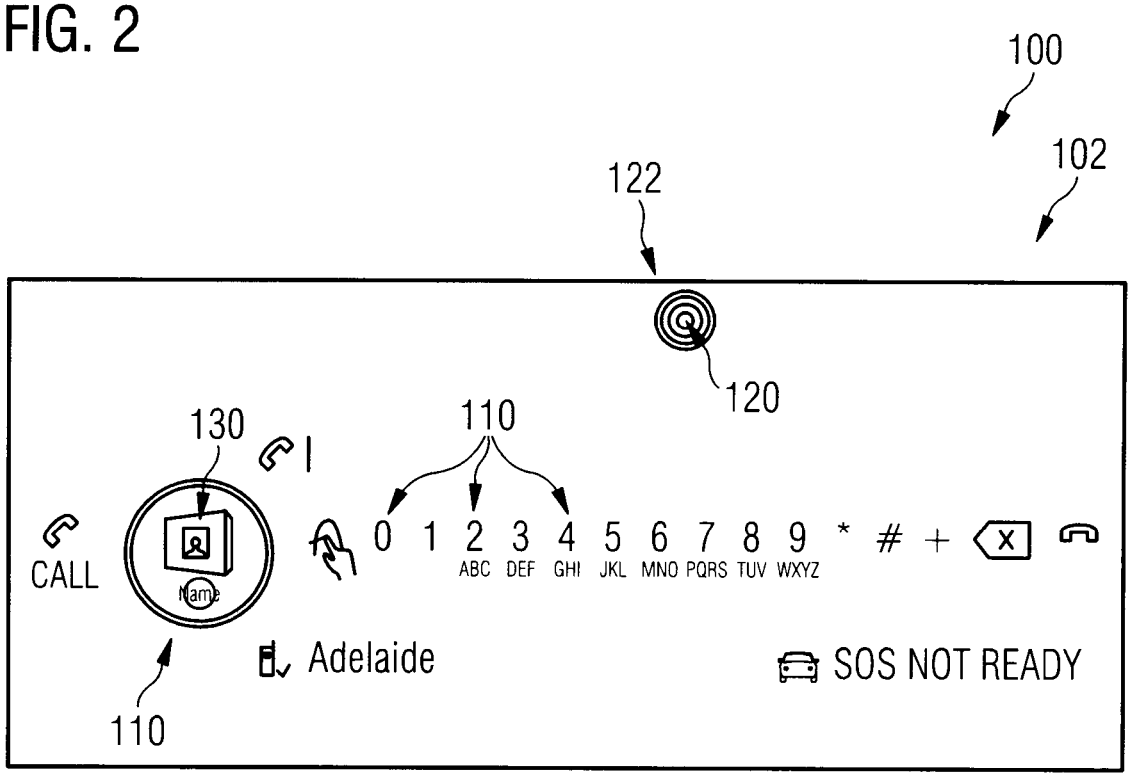
FIG. 2 schematically illustrates a combined eye and gesture tracking system including a graphical user interface displaying a graphical pointer with indicated eye focus position according to embodiments of the present disclosure.

FIG. 2 illustrates a combined eye and gesture tracking system 100 including a graphical user interface 102 displaying a graphical pointer 120 at an initiation position of the graphical pointer 122 and an indicated eye focus position 130 according to embodiments of the present disclosure. The initiation position may also be referred to as seed position. For example, the graphical pointer 120 may be located at the initiation position 122 when re-setting the system, e.g., after a timeout of user inactivity, etc. For example, the graphical pointer 120 may be located at the initiation position 122 in response to detecting an initiation user gesture. For example the initiation position of the graphical pointer can be the eye focus position on the graphical user interface, or the position on the graphical user interface, which the user has been looking at for the longest time within a predetermined time range. Furthermore, the initiation position can be the position on the graphical user interface, which the user has been looking at with the highest count of refocusing actions within a predetermined time range, or a median of determined eye focus positions that have been determined within a predetermined time range. Additionally, the initiation position can be a predetermined position on the graphical user interface, a so-called home position. For example, the graphical pointer 120 may be located at the initiation position 122 if the system initiates in a predefined state which does not depend on the eye gaze and/or the user gesture. Thereby, the position at which the graphical pointer is displayed may be typical for each of a plurality of menu pages and therefore may be easily recognized by the user.

Further, on the graphical user interface 102 a plurality of graphical items 110 are displayed. The indicated eye focus position 130 is not visible to the user, in other cases it can be visible to the user.

Figure 3:
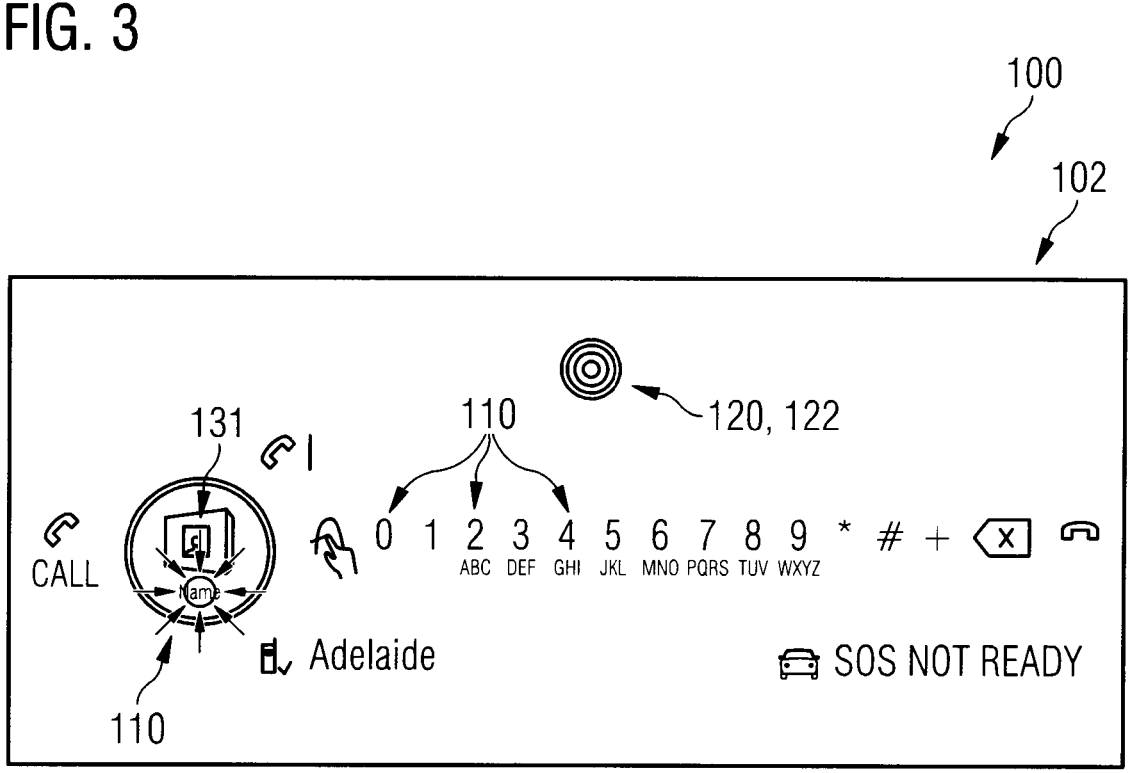
FIG. 3 schematically illustrates the graphical user interface of FIG. 2 with indicated eye focus position with an active gravity effect.

FIG. 3 illustrates the graphical user interface 102 of the combined eye and gesture tracking system 100 of FIG. 2 displaying a graphical pointer 120 at an initiation position of the graphical pointer 122 and a plurality of graphical items 110 according to embodiments of the present disclosure. Therein, the indicated eye focus position is displayed as eye focus position with an active gravity effect 131. Here, the user has focused the graphical item ("NAME") by an eye gaze, but has not yet made a substantial displacement user gesture, e.g. by moving the index finger. The eye focus position with an active gravity effect 131 is not visible to the user, in other cases it can be visible to the user. Generally, the displacement user gesture may correspond to movement of a body part in free space. For example, the displacement user gesture may relate to moving an arm and/or finger of the user. In accordance with gesture recognition systems known in the art, a gesture can be detected by a camera, or another contactless optical detection device. Therein, a gesture is a motion of the body, or a body part, that contains information, e.g. waving goodbye. Whereas pressing a key on a keyboard, or moving a mouse is not a gesture because the motion of a finger on its way to hitting a key, or the motion of the hand while moving the mouse is neither observed nor significant. All that matters is which key was pressed, or the movement of the mouse.

Figure 4:
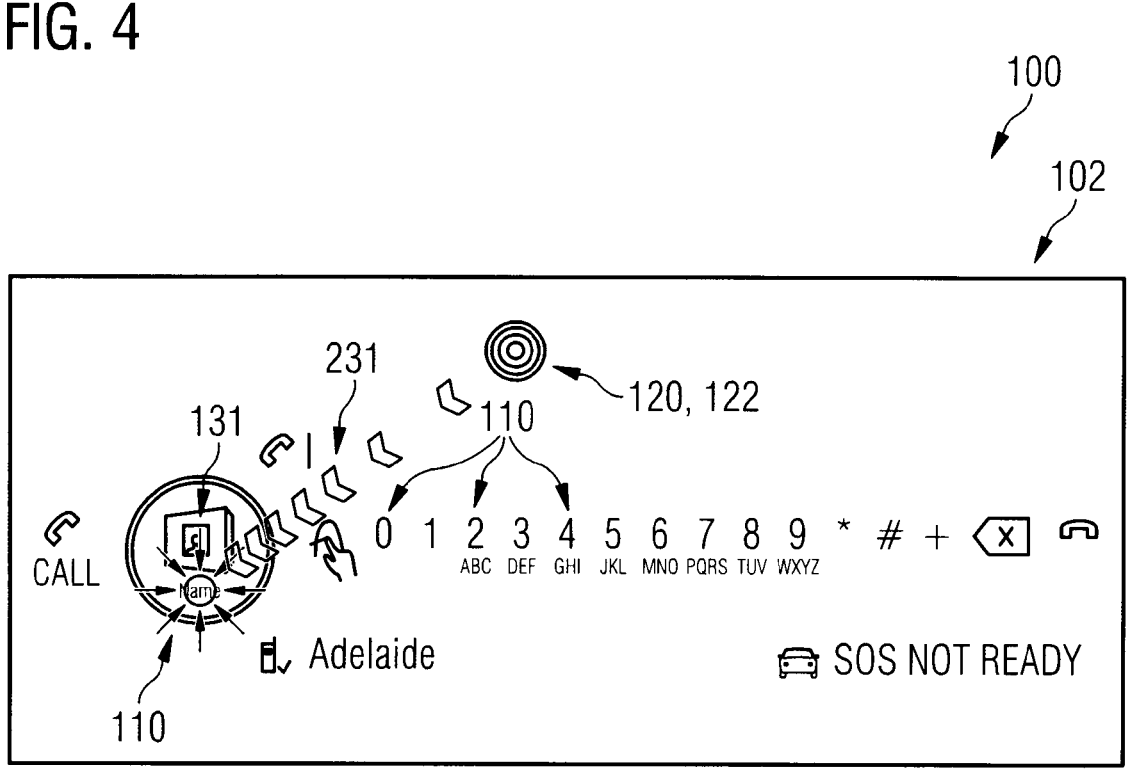
FIG. 4 schematically illustrates the graphical user interface of FIG. 3 with indicated displacement direction with active gravity effect.

FIG. 4 illustrates the graphical user interface of the combined eye and gesture tracking system 100 of FIG. 3 displaying a graphical pointer 120 at an initiation position 122 of the graphical pointer 120, a plurality of graphical items 110, and an eye focus position with an active gravity effect 131 according to embodiments of the present disclosure. Therein, a displacement direction 231 of the graphical pointer 120 is further displayed. The displacement direction 231 of the graphical pointer may or may not be visible to the user.

Figure 5:
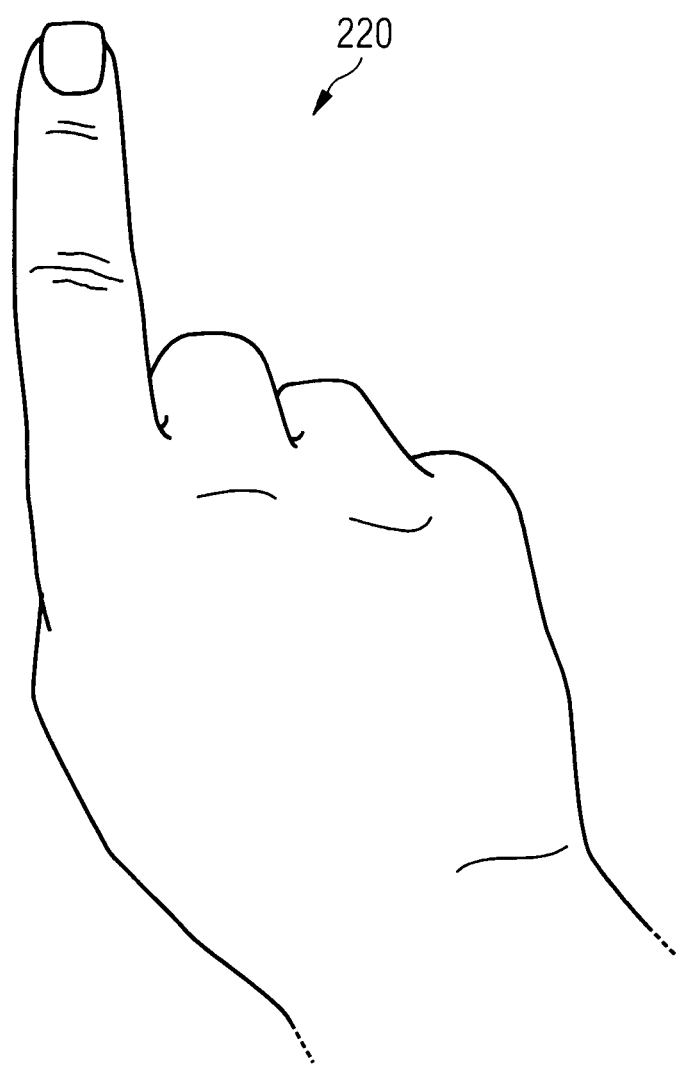
FIG. 5 schematically illustrates an initiation user gesture according to embodiments of the present disclosure.

FIG. 5 illustrates an initiation user gesture 220 according to embodiments of the present disclosure. Therein, the initiation user gesture is a gesture or position of a hand of a user, wherein all fingers are closed except the index finger, which is substantially extended to is full length. This is an example. In other examples, the initiation user gesture 220 can be a gesture or position of any body part of the user, comprising one or more fingers, in particular an index finger, a part of a hand, a hand, a part of an arm, an arm, shoulder, part of a shoulder or head of the user. Detection of the initiation user gesture 220 may result in the graphical pointer 120 being depicted at the initiation position 120.

Figure 6:
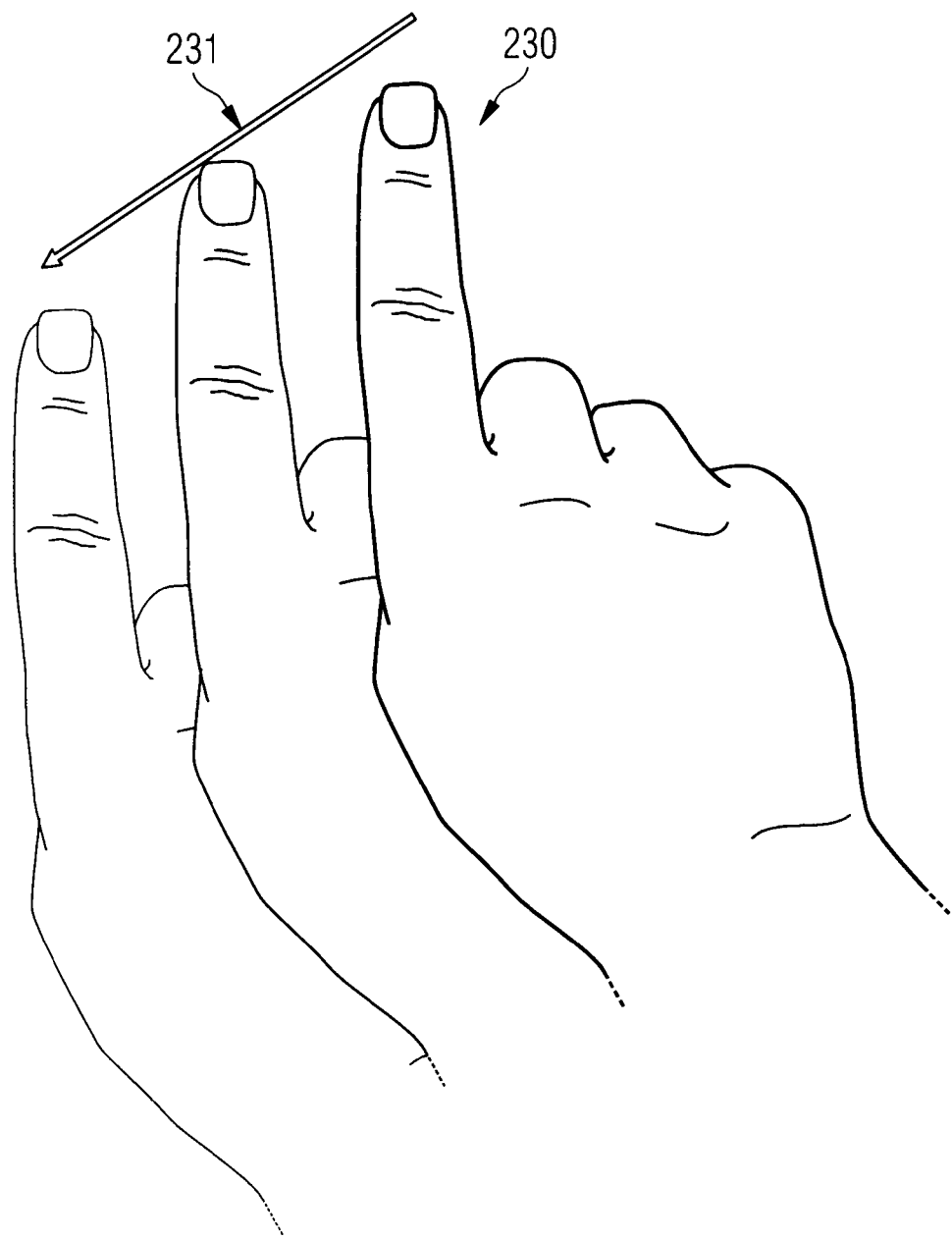
FIG. 6 schematically illustrates a displacement user gesture according to embodiments of the present disclosure.

FIG. 6 illustrates a displacement user gesture 230 according to embodiments of the present disclosure. Therein, the displacement user gesture 230 is a gesture or movement of a hand of a user, wherein all fingers are closed except the index finger, which is substantially extended tended to its full length, wherein the positions of the fingers relative to each other remain substantially equal, only the hand as a whole makes a substantially translational movement. The displacement user gesture 230 can be a gesture or position of any body part of the user, comprising one or more fingers, in particular an index finger, a part of a hand, a hand, a part of an arm, an arm, shoulder, part of a shoulder or head of the user. The displacement user gesture 230 can comprise a sampled anchor, e.g. the tip of the index finger or another tip of another extended finger, of the displacement user gesture 230. Further, the movement of the graphical pointer 120 can be controlled by a direct link between the sampled anchor of the displacement user gesture 230 and the movement of the graphical pointer 120. Therein, the direction and rate of movement of the graphical pointer 120 are directly correlated with the direction and rate of movement of the displacement user gesture 230, e.g. the direction and rate of movement of the sampled anchor. The illustrated displacement user gesture 230 is advantageous, as the position or movement of the tip of the index finger can easily and precisely be tracked by the combined eye and gesture tracking system 100.

Figure 7:
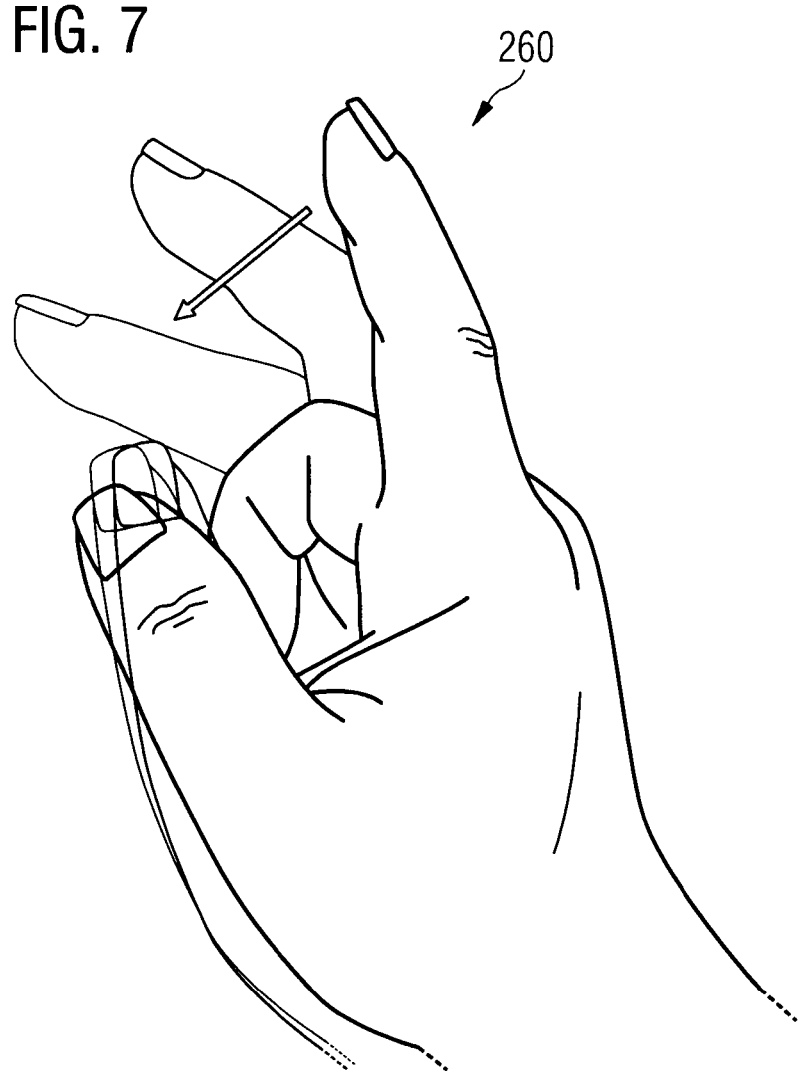
FIG. 7 schematically illustrates an engagement user gesture according to embodiments of the present disclosure.

FIG. 7 illustrates an engagement user gesture 260 according to embodiments of the present disclosure. Therein, the engagement user gesture 260 is a gesture or movement of a hand of a user, wherein all fingers are closed except the index finger, which is substantially extended to its full length, and wherein the index finger moves towards the palm of the hand. The engagement user gesture 260 can be a gesture or position of any body part of the user, comprising one or more fingers, in particular an index finger, a part of a hand, a hand, a part of an arm, an arm, shoulder, part of a shoulder or head of the user. The engagement gesture 260 can comprise the sampled anchor of the displacement user gesture 230.

Figure 8:
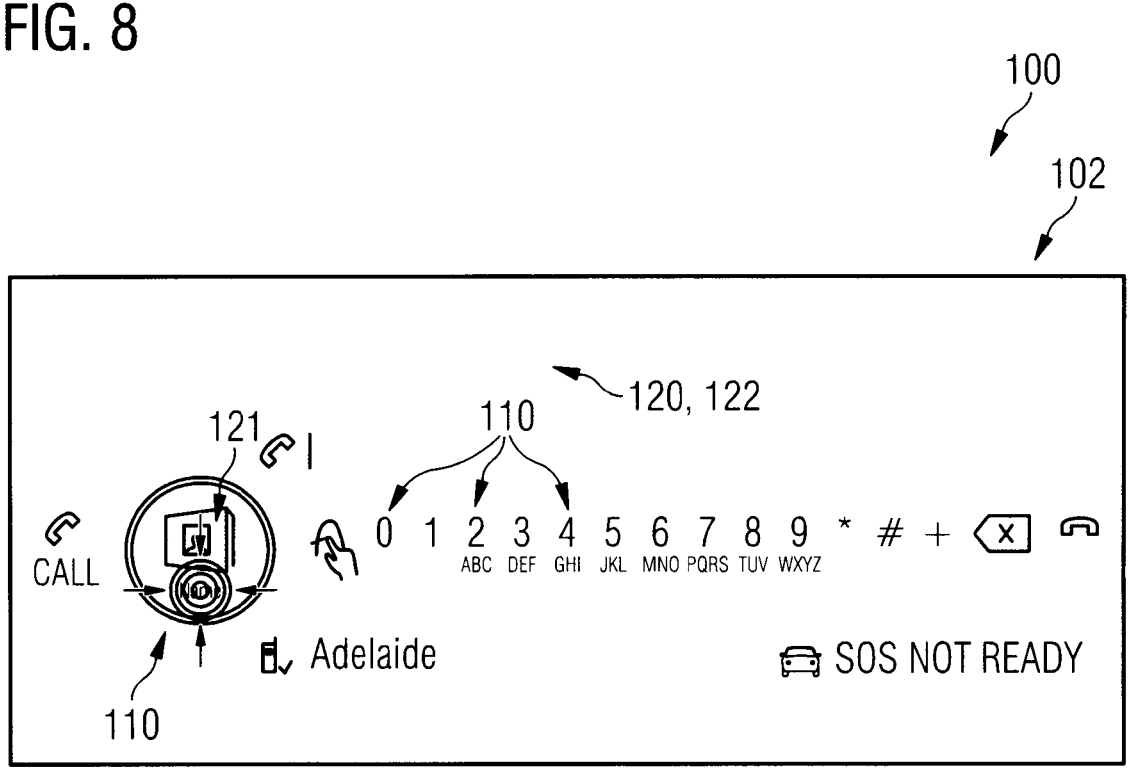
FIG. 8 schematically illustrates the graphical user interface of FIG. 2 with locked graphical pointer.

FIG. 8 illustrates the graphical user interface 102 of FIG. 2 with locked graphical pointer 121. In a locked state of the graphical pointer 121 during a transformation between user gestures of the body part or during the execution of a user gesture that is not authorized to change the position of the graphical pointer, the position of the graphical pointer cannot be substantially changed from the last valid position of the graphical pointer until a user gesture is recognized which authorizes change of the position of the graphical pointer. The locked state of the graphical pointer 121 is not necessarily visually indicated to the user. In the example of FIG. 8, the user is engaging the graphical item 110 beneath the current eye focus position 130 by an engagement gesture 230—therefore the position of the graphical pointer 121 is temporarily locked.

Figure 9:
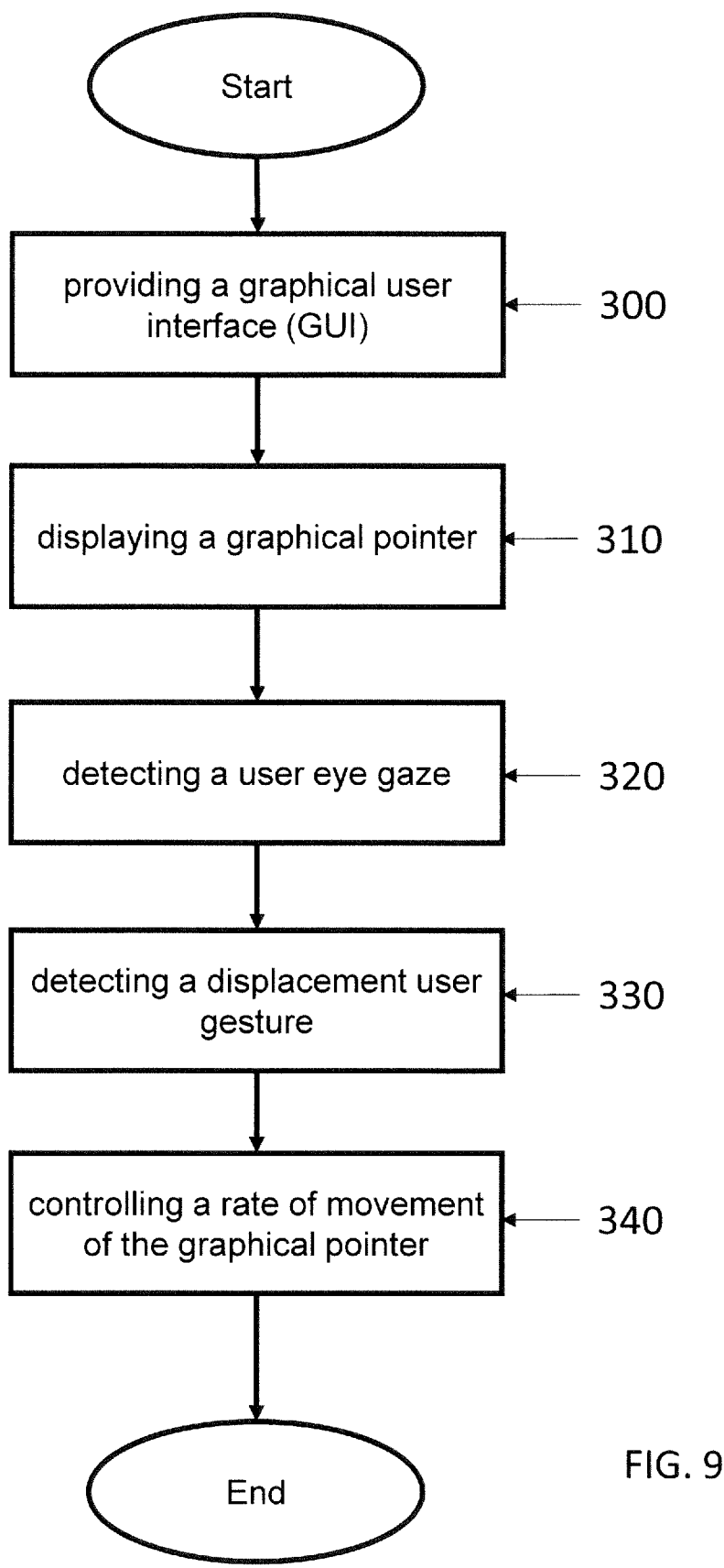
FIG. 9 illustrates a flowchart of a method for controlling a combined eye and gesture tracking system according to embodiments of the present disclosure.

FIG. 9 illustrates a flowchart of a method for controlling a combined eye and gesture tracking system 100 according to embodiments of the present disclosure. The method is started, then a graphical user interface 102 is provided to a user, wherein a plurality of graphical items 110 on the graphical user interface 102 are displayed to the user in step 300. In step 310, a graphical pointer 120 is displayed on the graphical user interface 102. Therein, displaying the graphical pointer can comprise animation such as fading in of the graphical pointer. In step 320, a user eye gaze 210 associated with the eyes of the user is detected. The step 320 of detecting a user eye gaze 210 can comprise calculating a user eye gaze from user eye gaze data, which is obtained by continuously tracking the eyes of a user. The step 320 of detecting a user eye gaze 210 may not be indicated to the user. In step 330, a displacement user gesture 230 associated with a body part of the user is detected. For example, recognition of a displacement user gesture 230 may trigger a system action visible for the user such as movement of the graphical pointer 120. For example, the displacement user gesture 230 may trigger the movement of the graphical pointer 120. In step 340, a rate of movement of the graphical pointer 120 on the display of the graphical user interface 102 is controlled based on the displacement user gesture 230 and the user eye gaze 210. Therein, the rate of movement of the graphical pointer can correlate directly to the rate of movement of the displacement user gesture 230. In other examples, the rate of movement of the graphical pointer 120 can be faster or slower than the rate of movement of the displacement user gesture 230. In another example the rate of movement of the graphical pointer 120 can be a variable movement, in particular the rate of movement can increase or decrease during the movement, or can be respectively slower or faster than the rate of movement of the displacement user gesture 230 at the beginning or end of the movement of the graphical pointer 120, based on the user eye gaze 210. In step 340 of controlling a rate of movement based on displacement user gesture 230 and the user eye gaze 210, the user eye gaze 210 can be a correlated user eye gaze, wherein the correlated user eye gaze is temporally correlated to the displacement user gesture. In particular, the correlated user eye gaze can be detected at the same time as the displacement user gesture 230. The method ends after step 340.

Figure 10:
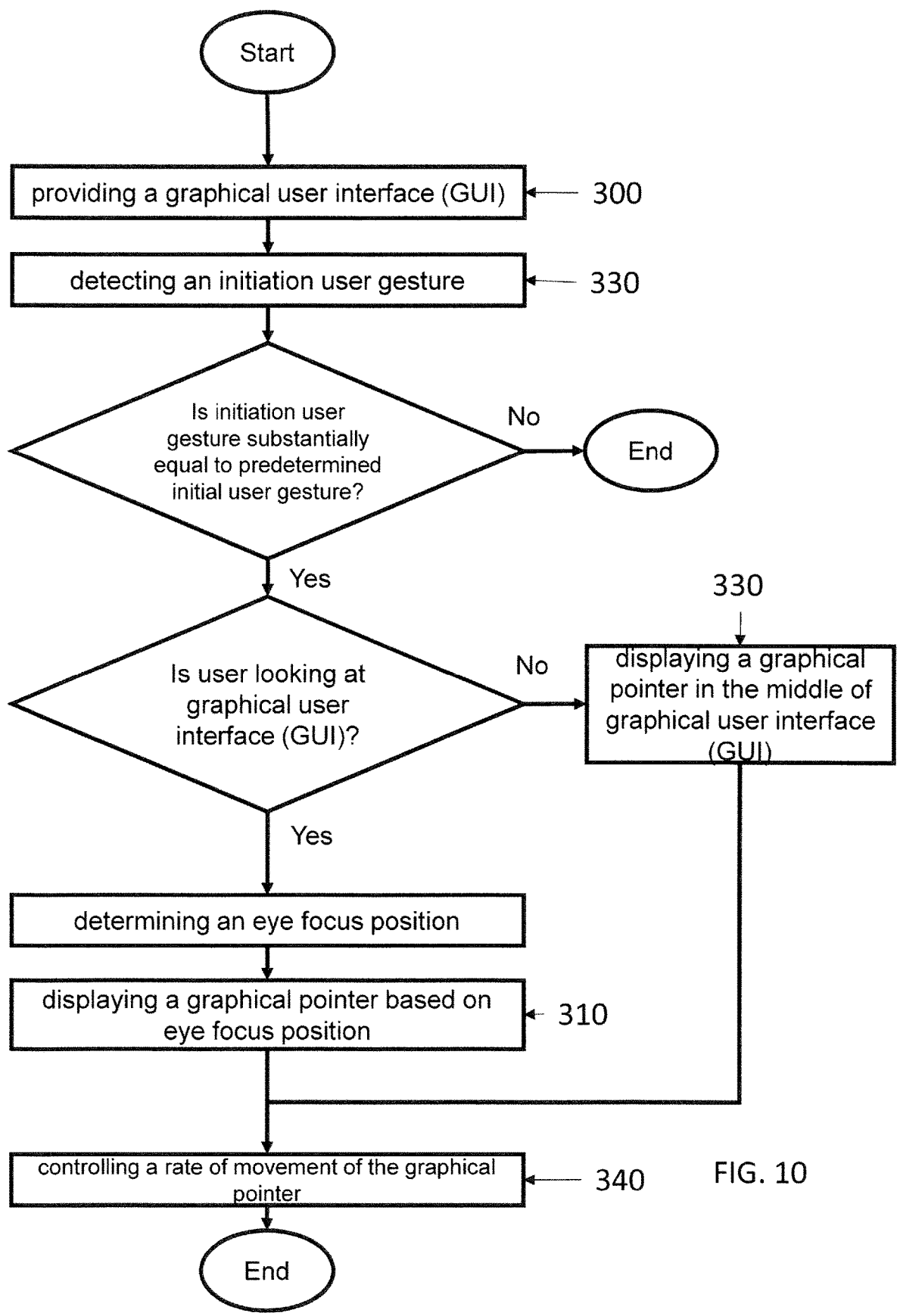
FIG. 10 illustrates a flowchart of a method for controlling a combined eye and gesture tracking system according to an example.

FIG. 10 illustrates a flowchart of a method for controlling a combined eye and gesture tracking system 100 according to another example. The method starts and in step 300 a graphical user interface 102 is provided to a user. In step 330, an initiation user gesture 220 is detected. The step 330 of detecting the initiation user gesture 220 can further comprise deciding if the initiation user gesture 220 is within in a valid spatial zone for recognition, wherein the initiation user gesture 220 is only confirmed to be present if the initiation user gesture 220 is within the valid special zone for recognition. Then it is decided if the initiation user gesture 220 is substantially equal to one of a plurality of predetermined initial user gestures. If it is decided that initiation user gesture 220 is not substantially equal to one of a plurality of predetermined initial user gestures, then the process ends. Therefore, only when the user gesture corresponds to one of a plurality of initiation user gestures, the graphical pointer 120 is controlled. If it is decided that the initiation user gesture 220 is substantially equal to one of a plurality of predetermined initial user gestures, then it is decided if the user is looking at the graphical user interface 102. If it is decided that the user is not looking at the graphical user interface 102, then in step 330 a graphical pointer 120 is displayed in the middle, center or at a predetermined home position of the graphical user interface 102. Then, in step 340, a rate of movement of the graphical pointer 120 is controlled. If it is decided that the user is looking at the graphical user interface 102, then an eye focus position 130 is determined. After that, in step 310, a graphical pointer 120 is displayed on the graphical user interface 102 based on the eye focus position 130. In step 340, a rate of movement of the graphical pointer 120 is controlled.

The method can comprise detecting that the displacement user gesture 230 corresponds to one of a plurality of predetermined displacement user gestures associated with a body part of the user, wherein the body part of the user is moved in a displacement direction 231 relative to the graphical user interface 102. Controlling a rate of movement of the graphical pointer 120 can comprise moving the graphical pointer 102 with a variable rate of movement in the displacement direction 231 to a position associated with one of the plurality of graphical items taking into account the user eye gaze. Further, controlling a rate of movement of the graphical pointer 120 can comprise comparing the displacement direction 231 with the eye focus position 130, and moving the graphical pointer with a higher speed, if or only if the displacement direction 231 correlates with the eye focus position 130. Moving the graphical pointer 120 with a higher speed, only if the displacement direction 231 correlates with the eye focus position 130 further increases the precision and speed of the combined eye and gesture tracking system. This so-called virtual gravity effect can be switched on or off based on the correspondence of displacement user gesture 231 and eye focus position 130. When continuous eye tracking data is available, a continuously calculated eye focus position can be checked against the displacement user gesture 230 by a further algorithm continuously. The gravity effect can accelerate when the graphical pointer 120 gets closer towards the eye focus position 130. The gravity effect may get stronger as the gap is closing down to a graphical target item and may even have a snap-in effect within a certain range of the graphical target item, wherein the movement is further accelerated towards the graphical target item and is stopped, once it has reached the graphical target item.

In case the system does not recognize a correlation, e.g. the gesture moves in the opposite direction to the eye focus position 130, the acceleration effect is reduced or disabled at all—so the graphical pointer 120 is solely controlled by the displacement user gesture—until the combined eye and gesture tracking system 100 recognizes a valid correlation again between eye tracking data (eye user gaze) and displacement user gesture 230, which would enable or increase the acceleration effect again.

Further, each graphical item 110 can comprise a predetermined snap-in area around the graphical item 110, wherein a rate of movement of the body part leads to a smaller rate of movement of the graphical pointer 120 when the graphical pointer 120 is within the predetermined snap-in area and the displacement direction 231 is not substantially in direction to the graphical item 110, compared to a rate of movement of the graphical pointer 120 when the graphical pointer 120 is within the predetermined snap-in area and the displacement direction 231 is substantially in direction to the graphical item 110 or when the graphical pointer is not within the predetermined snap-in area. The snap-in area further increases the precision and speed of the combined eye and gesture tracking system, wherein the graphical pointer 120 tends to be held in a position over a graphical item. The method can further comprise the step of controlling the graphical pointer 120 to one of the plurality of graphical items 110 and activating a corresponding function associated with the one of the plurality of graphical items 110. The process is ended after that.

Additionally, the method for controlling a combined eye and gesture tracking system 100 can comprise detecting that a user gesture made by the user is not substantially equal to one of the group of predetermined initiation gestures, predetermined displacement gestures or predetermined engagement gestures, and/or detecting that the user gesture is not valid any more, e.g. the user has removed the body part from the valid spatial zone for recognition or the user has started a new user gesture which invalidates the previous user gesture and parts of its data, and accordingly removing the graphical pointer 120 from the graphical user interface 102. Removing the graphical pointer 120 can comprise fading the graphical pointer 120 out.

Figure 11:
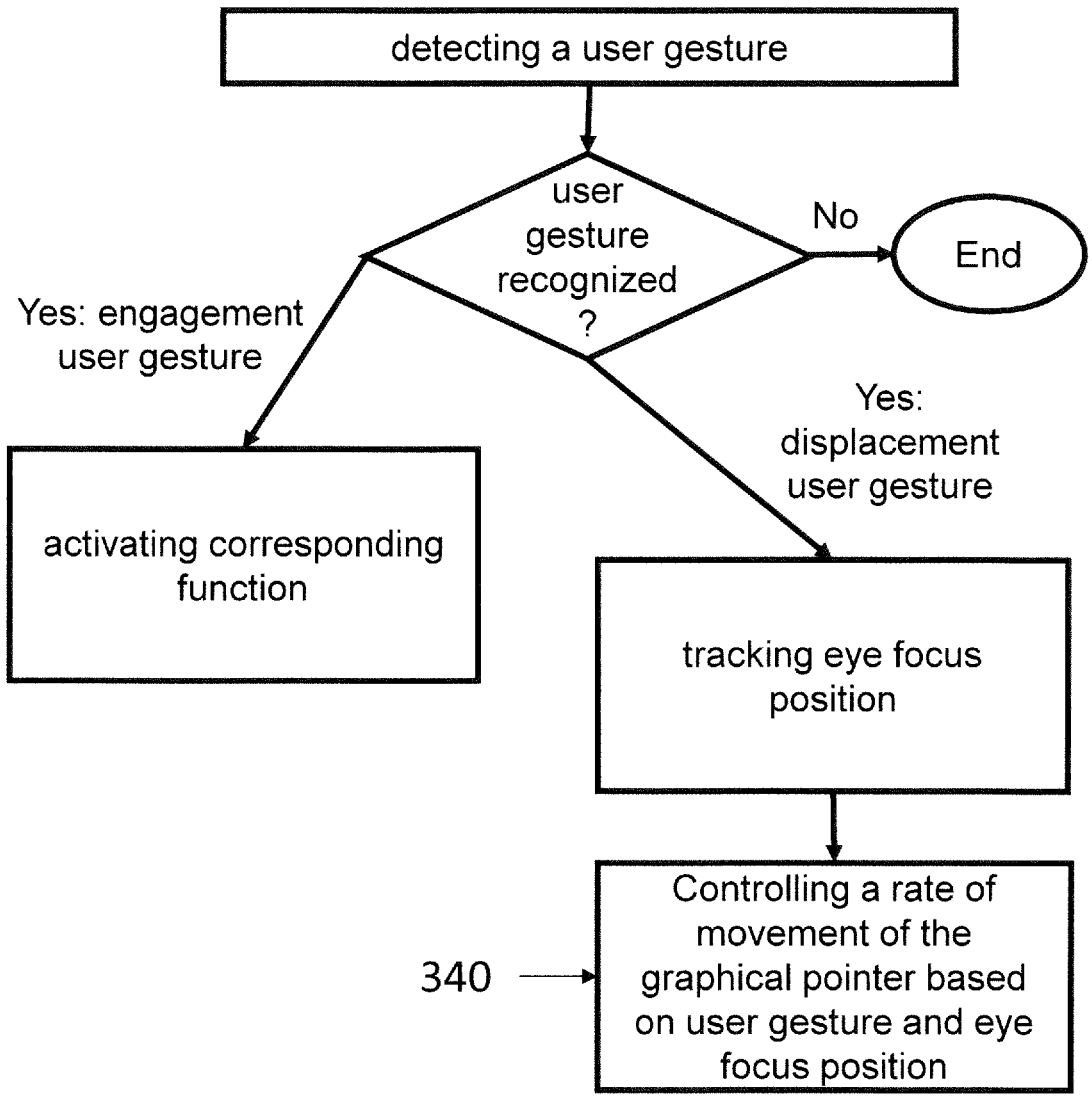
FIG. 11 illustrates a flowchart of a method for controlling a combined eye and gesture tracking system according to another example.

FIG. 11 illustrates a flowchart of a method for controlling a combined eye and gesture tracking system according to another example. First, a user gesture is detected. Then, it is decided if the user gesture is recognized. If the user gesture is not recognized, the process ends. If the user gesture is recognized as a displacement user gesture 230, then an eye focus position 130 is tracked. After that, in step 340, a rate of movement of the graphical pointer 120 is controlled based on the user gesture and the eye focus position. If the user gesture is recognized as an engagement user gesture 260, then a corresponding function is activated.

LIST OF REFERENCE SIGNS 100 combined eye and gesture tracking system
101 camera
102 graphical user interface
103 memory
104 processor
110 graphical item
120 graphical pointer
121 graphical pointer in locked state
122 initiation position of the graphical pointer
130 eye focus position
131 eye focus position with an active gravity effect
210 user eye gaze
220 initiation user gesture
230 displacement user gesture
231 displacement direction
260 engagement user gesture
300 providing a graphical user interface
310 displaying a graphical pointer
320 detecting a user eye gaze
330 detecting a displacement user gesture
340 controlling a rate of movement of the graphical pointer
350 detecting an engagement user gesture

The invention claimed is:

1. A method for controlling a combined eye and gesture tracking system, wherein the method comprises the following steps:
    providing a graphical user interface to a user including a plurality of graphical items displayed on the graphical user interface;
    displaying a graphical pointer on the graphical user interface;
    detecting a user eye gaze associated with eyes of the user;
    detecting a displacement user gesture, which is a movement of a body part of the user in free space, wherein the body part is moved in a displacement direction relative to the graphical user interface;
    determining that the user is looking at the graphical user interface;
    determining an eye focus position on the graphical user interface;
    in response to detecting that the displacement direction is directed toward the eye focus position, controlling a rate of movement of the graphical pointer on the graphical user interface from an initial position of the graphical pointer in the graphical user interface to the eye focus position based on the displacement direction and the eye focus position, wherein controlling the rate of movement of the graphical pointer comprises increasing the rate of movement of the graphical pointer toward the eye focus position until the graphical pointer reaches the eye focus position while the displacement direction is directed toward the eye focus position; and
    setting the graphical pointer to a locked state during an execution of a first user gesture that is not authorized to change a position of the graphical pointer in such a way, that during the locked state, the position of the graphical pointer cannot be substantially changed from a last valid position of the graphical pointer until a second user gesture is recognized as authorized to change the position of the graphical pointer.

2. The method of claim 1, further comprising:
    detecting that the displacement user gesture corresponds to one of a plurality of predetermined displacement user gestures associated with the body part of the user, wherein the body part of the user is moved in the displacement direction; and
    controlling the rate of movement of the graphical pointer comprises moving the graphical pointer with a variable rate of movement in the displacement direction to a position associated with one of the plurality of graphical items.

3. The method of claim 1, wherein the displacement user gesture is a motion of the body part in free space, which is detected by a contactless optical device.

4. The method of claim 1, wherein controlling the rate of movement of the graphical pointer comprises:
    comparing the displacement direction with the eye focus position; and
    moving the graphical pointer with a higher speed, only if the displacement direction correlates with the eye focus position.

5. The method of claim 1, wherein each graphical item included in the plurality of graphical items comprises a predetermined snap-in area around the graphical item, wherein a rate of movement of the body part leads to a smaller rate of movement of the graphical pointer when the graphical pointer is within the predetermined snap-in area and the displacement direction is not substantially in a direction to the graphical item, compared to the rate of movement of the graphical pointer when the graphical pointer is within the predetermined snap-in area and the displacement direction is substantially in the direction to the graphical item or when the graphical pointer is not within the predetermined snap-in area.

6. The method of claim 1, wherein the method further comprises:
    detecting an initiation user gesture; and
    determining if the initiation user gesture is substantially equal to a predetermined initiation user gesture;
    wherein the steps of displaying the graphical pointer and controlling the rate of movement of the graphical pointer are performed only if the initiation user gesture is substantially equal to the predetermined initiation user gesture.

7. The method of claim 1, wherein displaying the graphical pointer further comprises:
    determining an initiation position of the graphical pointer on the graphical user interface; and
    displaying the graphical pointer at the initiation position.

8. The method of claim 7, wherein the initiation position of the graphical pointer is:
    the eye focus position on the graphical user interface; or
    a position on the graphical user interface, which the user has been looking at for a longest time within a predetermined time range; or
    a position on the graphical user interface, which the user has been looking at with a highest count of refocusing actions within the predetermined time range; or
    a median of determined eye focus positions that have been determined within the predetermined time range, or
    a predetermined position on the graphical user interface.

9. The method of claim 1, wherein the method further comprises:
    detecting an engagement user gesture associated with the body part of the user;
    determining, if the engagement user gesture is substantially equal to a predetermined engagement user gesture; and
    selecting one of the plurality of graphical items associated with a position of the graphical pointer if the engagement user gesture is substantially equal to the predetermined engagement user gesture.

10. The method of claim 1, wherein the body part comprises at least one of a finger, an index finger, part of a hand, a hand, part of an arm, an arm, or part of a shoulder of the user.

11. The method of claim 1, further comprising:
detecting, that a user gesture made by the user is not substantially equal to one of a group of predetermined initiation gesture, predetermined displacement gesture, or predetermined engagement gesture; and
removing the graphical pointer from the graphical user interface.

12. A combined eye and gesture tracking system comprising:
at least one camera,
at least one graphical user interface,
a memory configured to store program code, and
at least one processor coupled with the memory and the at least one graphical user interface and configured to execute the program code, wherein execution of the program code causes the at least one processor to perform the steps of:
displaying a plurality of graphical items on the at least one graphical user interface to a user;
displaying a graphical pointer on the at least one graphical user interface;
detecting a user eye gaze associated with eyes of the user;
detecting a displacement user gesture, which is a movement of a body part of the user in free space, wherein the body part is moved in a displacement direction relative to the at least one graphical user interface;
determining that the user is looking at the at least one graphical user interface;
determining an eye focus position on the at least one graphical user interface;
in response to detecting that the displacement direction is directed toward the eye focus position, controlling a rate of movement of the graphical pointer on the at least one graphical user interface from an initial position of the graphical pointer in the at least one graphical user interface to the eye focus position based on the displacement direction and the eye focus position, wherein controlling the rate of movement of the graphical pointer comprises increasing the rate of movement of the graphical pointer toward the eye focus position until the graphical pointer reaches the eye focus position while the displacement direction is directed toward the eye focus position; and
setting the graphical pointer to a locked state during an execution of a first user gesture that is not authorized to change a position of the graphical pointer in such a way, that during the locked state, the position of the graphical pointer cannot be substantially changed from a last valid position of the graphical pointer until a second user gesture is recognized as authorized to change the position of the graphical pointer.

* * * * *

UNITED STATES PATENT AND TRADEMARK OFFICE
CERTIFICATE OF CORRECTION

PATENT NO. : 11,320,956 B2
APPLICATION NO. : 16/345687
DATED : May 3, 2022
INVENTOR(S) : Adam Rohrbacher It is certified that error appears in the above-identified patent and that said Letters Patent is hereby corrected as shown below:

On the Title Page

Item (54), and In the Specification Column 1 Line 1, delete "COMBINED EYE AND GESTURE TRACKING METHOD" and insert --COMBINED EYE AND GESTURE TRACKING--;

Item (57), Line 1, delete "Method" and insert --Combined eye and gesture tracking method--.

Signed and Sealed this
Fifth Day of July, 2022

Katherine Kelly Vidal
*Director of the United States Patent and Trademark Office*